United States Patent [19]
Guthrie

[11] Patent Number: 5,821,634
[45] Date of Patent: Oct. 13, 1998

[54] ELECTRICAL CIRCUIT TO REDUCE VOLTAGE SUPPLIED TO SENSITIVE COMPONENTS FROM ELEVATED VOLTAGE SUPPLY OF A VEHICLE BATTERY

[76] Inventor: Allan George Alexander Guthrie, 104 Ashurst Ave., Southend-on-Sea, Essex, England, SS2 4TD

[21] Appl. No.: 716,839

[22] Filed: Sep. 19, 1996

[30] Foreign Application Priority Data

Sep. 27, 1995 [GB] United Kingdom .................... 9519733

[51] Int. Cl.$^6$ .................................................. B60R 25/10
[52] U.S. Cl. .......................... 307/10.7; 307/9.1; 307/10.1; 323/293
[58] Field of Search ..................................... 307/9.1, 10.1, 307/10.7, 10.8; 323/229, 233, 364, 293, 304, 352

[56] References Cited

U.S. PATENT DOCUMENTS

| | | | |
|---|---|---|---|
| Re. 23,531 | 7/1952 | Villebonnet | 323/293 |
| 2,586,748 | 2/1952 | Villebonnet | 323/293 |
| 3,891,888 | 6/1975 | Southgate | 315/82 |
| 4,216,525 | 8/1980 | Spiteri | 307/64 |
| 5,053,677 | 10/1991 | Sanner et al. | 307/10.8 |
| 5,576,686 | 11/1996 | Westermeir et al. | 307/10.7 |

FOREIGN PATENT DOCUMENTS

| | | |
|---|---|---|
| 0059914 | 2/1982 | European Pat. Off. . |
| 0225140 | 11/1986 | European Pat. Off. . |
| 0954120 | 3/1962 | United Kingdom . |
| 1114102 | 1/1967 | United Kingdom . |
| 1207345 | 11/1967 | United Kingdom . |
| 1577239 | 8/1977 | United Kingdom . |

*Primary Examiner*—Jeffrey A. Gaffin
*Assistant Examiner*—Peter Ganjian
*Attorney, Agent, or Firm*—Thomas M. Freiburger

[57] ABSTRACT

An electrical circuit for a vehicle comprises a first branch or sub-circuit and at least one second branch or sub-circuit. The first branch or sub-circuit includes the vehicle battery, an electrical generator to be driven by the vehicle's engine or transmission and for charging the battery, a starter motor to be driven by the battery for initiating engine operation, and a number of electrical components operable at voltages equal to or greater than the battery's nominal output voltage. At least one of the second branches or sub-circuits includes a number of other electrical components (e.g. lamps) that are susceptible to damage if the voltage supply thereto is too high, this second branch or sub-circuit being connected to the first branch or sub-circuit via an element, e.g. a diode, providing a substantially constant voltage drop.

13 Claims, 4 Drawing Sheets

VOLTAGE REGULATOR CHARACTERISTICS

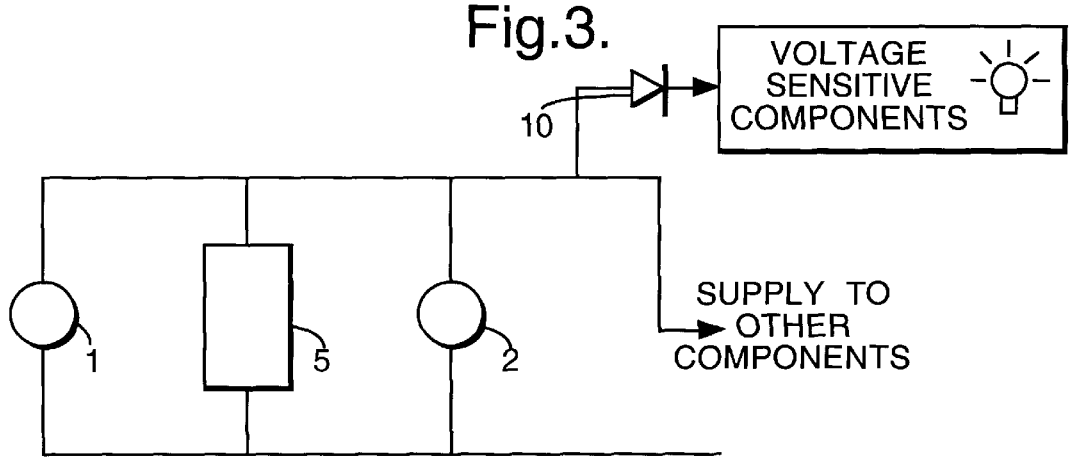
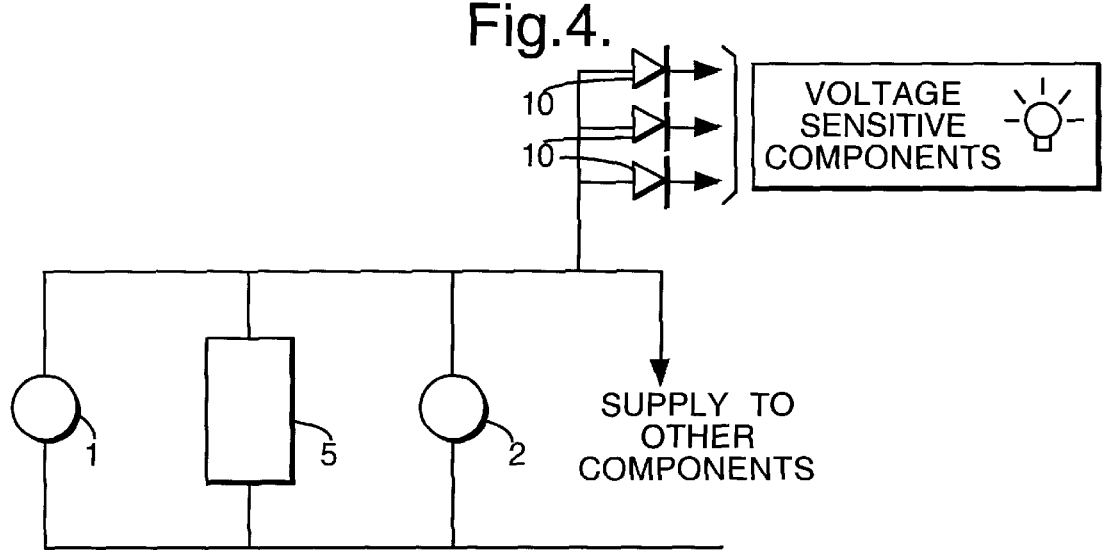
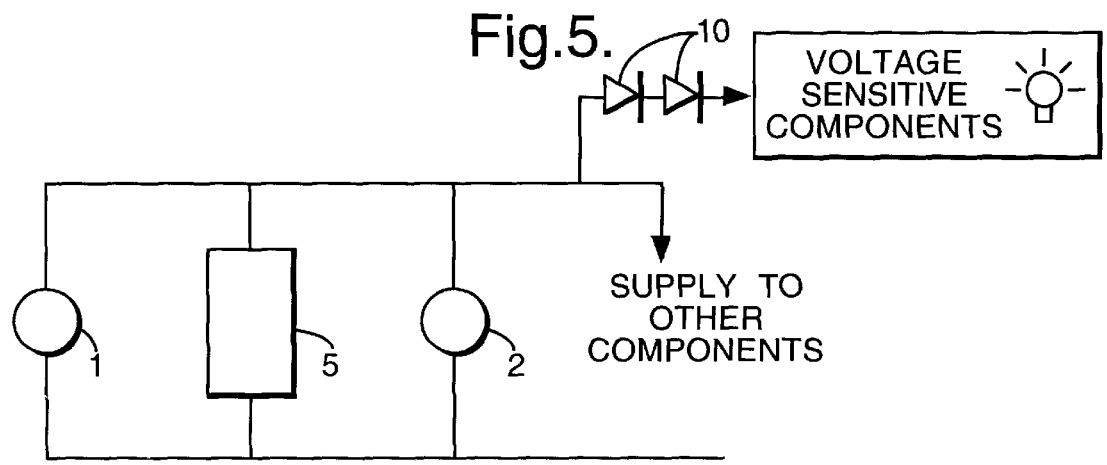

ELECTRICAL CIRCUIT TO REDUCE VOLTAGE SUPPLIED TO SENSITIVE COMPONENTS FROM ELEVATED VOLTAGE SUPPLY OF A VEHICLE BATTERY

This invention relates to electrical circuits and in particular to electrical circuits for vehicles.

TECHNICAL FIELD

There is a long-standing problem in cars, commercial vehicles, tractors etc. of either the vehicle's lights being unilluminated because the bulb has "blown" or the headlights being excessively bright. The root of this problem stems from the wide variation in the voltage of the vehicle's electrical system from the battery and/or the means of recharging it.

In general, the output voltage level of a fully charged, nominally "12 volt", car battery is actually about 12.7 volts, and this voltage falls to around 12 volts if the vehicle headlights are turned on (the light bulbs being usually rated at 13.5 volts). At normal temperatures and when the engine is running at a speed corresponding to the vehicle travelling at about 30 mph, the vehicle's alternator charges the battery and the voltage of the battery is controlled by a voltage regulator such that it rises to about 14.2 volts. However, to achieve the level of 14.2 volts at the battery, it is possible for the voltage at the alternator to be still higher, e.g. greater than 15.0 volts, to cater for the voltage drop along the cables.

The need for a charging voltage of 14.2 volts across the battery when the car is being driven is to ensure that the battery is as fully charged as possible at all times. As is well known, the battery needs to be recharged to replace (a) the power which it supplies to the electric circuits when the car is not in use, e.g for parking lights,
(b) the power to start the engine, and
(c) the power which the battery has to provide at times when the engine is running and the electrical system requires more power than the alternator can provide, e.g. when the vehicle is in a traffic jam or being driven slowly. Indeed some cars have an alternator setting higher than 14.2 volts as a means of improving the "city cycle" performance.

As a general rule, the voltage at the light bulbs should not exceed 15.0 volts and, if at all possible, should be nearer the 13.5 volts at which they are usually rated.

The battery life is very dependent on its operating temperature and the recharging voltage. At normal temperature and a recharging voltage of 14.2 volts, a discharged battery will pass an acceptable charging current sufficient to fully charge the battery in a reasonable time yet not continue to accept any further significant current which might cause the battery to deteriorate. At higher temperatures and a recharging voltage of 14.2 volts, the battery will pass higher currents both to charge the battery and after it has become fully charged. Any such higher current passing through a fully charged battery causes it to deteriorate and it is therefore usual to control the voltage output at the alternator so that its output is lowered as the temperature increases. Conversely, at lower temperatures, the battery will only pass much lower currents at a recharging voltage 14.2 volts and it therefore takes much longer to charge the battery. Accordingly the alternator voltage has to be increased, as the temperature decreases.

In general the voltage which needs to be applied to the battery in order for the battery to pass an acceptable charging current is approximately 15.0 volts when the battery is at 0° C. and is in the region of 16 volts when the battery is at −30° C. to −40° C.

Although the light output of a bulb increases significantly with increasing voltage at the bulb, the service life of the light bulbs can be very short when the bulbs are run at higher voltages. Certainly the use of voltages higher than 15.0 volts causes an unacceptably short service life for light bulbs and this is made even worse where, as frequently occurs, the alternator voltage—and hence the voltage across the light bulbs—is even higher than the voltage across the battery.

BACKGROUND ART

The usual way of tackling this problem is to restrict the alternator output voltage. This leads to cars used in cold climates or during cold weather having batteries which are not fully charged, which are therefore operated at lower states of charge, and which thus having reduced service lives.

It is thus clearly desirable to provide a vehicle electrical circuit which can overcome the conflicting aims of maximising the battery recharging voltage whilst restricting the voltage to the lighting and/or, other voltage-sensitive circuit(s).

SUMMARY OF THE INVENTION

According to one aspect of this invention there is provided an electrical circuit for a vehicle, the circuit comprising:

(a) a first branch or sub-circuit including the battery, an alternator to be driven by the vehicle's engine or transmission and for recharging the battery, a starter motor deriving electrical power from the battery and for initiating engine operation, and at least one electrical component relatively insensitive to voltages somewhat higher than the battery's nominal output voltage; and (b) a second branch or sub-circuit including at least one supply-voltage-sensitive electrical component (e.g. lighting units) and connected to the first branch or sub-circuit via an element providing a substantially constant voltage drop.

According to another aspect of this invention there is provided a vehicle electrical circuit providing in use two voltage levels; the first voltage level is in use, that associated with inter alia the battery, alternator, and starter motor; that the second (other), lower, voltage level is, in use, associated with voltage-sensitive components (e.g. light bulbs) which are susceptible to damage or shortened life if supplied at the higher first voltage level.

By this arrangement it may be possible to allow the voltage across the battery to reach (and perhaps exceed) 15 volts without endangering the voltage-sensitive components.

The creation of the second voltage level is preferably achieved by use of a diode connected such that its "forward voltage drop" provides the second voltage level from the first. The diode is a device which has high resistance to electric current in one direction and low resistance in the other. Whilst current is passing through the diode in the low resistance direction, a small voltage drop or potential difference is produced, e.g. in the region of 1 volt. This voltage drop is relatively constant regardless of the level of current.

BRIEF DESCRIPTION OF THE DRAWINGS

By way of example one embodiment of this invention will now be described with reference to the accompanying drawings of which:

FIGS. 3–7 are circuit diagrams illustrating different embodiments of the present invention.

DETAILED DESCRIPTION OF EMBODIMENTS OF THE INVENTION

Figure 1:
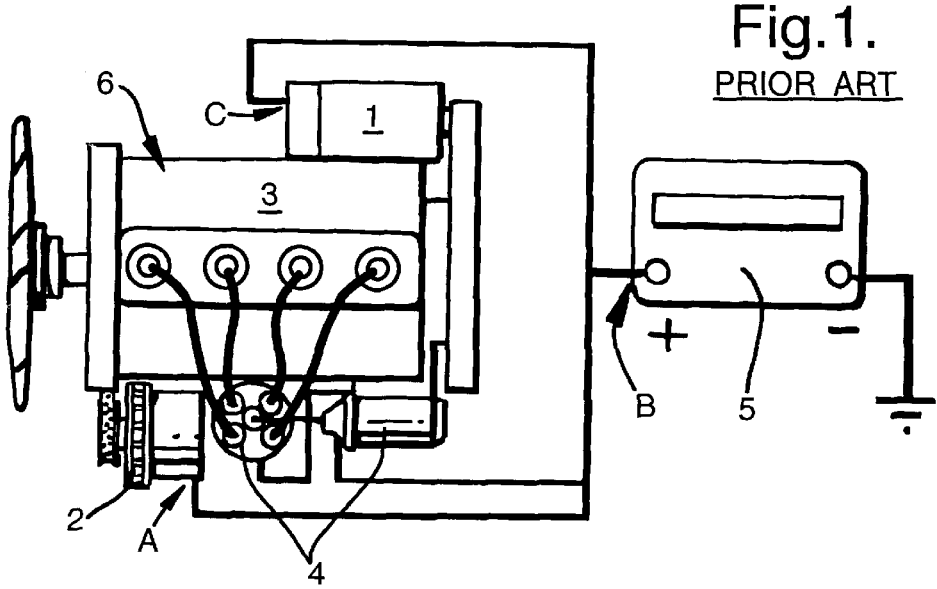
FIG. 1 is schematic diagram showing a vehicle engine and electrical components associated therewith.

The engine 6 in FIG. 1 drives a distributor 4 which provides an electrical supply to the spark plugs 3. The main electrical supply from the battery 5 is fed to the engine's starter motor 1, and the battery is recharged from a three-phase alternator and voltage regulator 2 that are usually incorporated in a single housing. The alternator's output is connected to the battery and its voltage regulator is responsive to the battery's output voltage such as appropriately to adjust the alternator's output voltage to provide a desired voltage level at the battery. In effect the starter motor and the alternator/regulator are connected in parallel with one another across the battery terminals, and an electrical supply from connections A, B or C is taken to the vehicle's other electrical components to render them likewise in parallel with the alternator/regulator 2.

Figure 2:
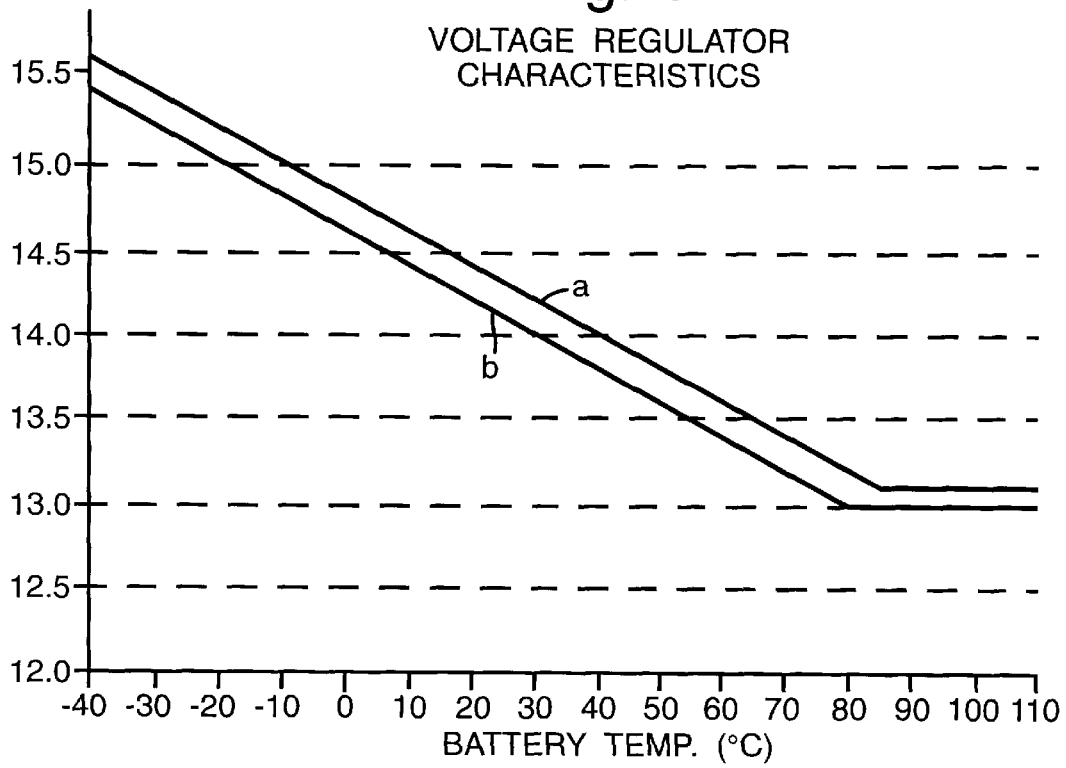
FIG. 2 is a graph showing the band of voltage variations with battery temperature characteristics for a voltage regulator suitable for a typical car battery.

FIG. 2 shows the output of a voltage regulator in accordance with the invention, with an upper curve (a) illustrating the variation with ambient temperature of a higher, primary voltage and a lower curve (b) illustrating the variation with ambient temperature of a lower, secondary voltage. The two curves (a) and (b) follow one another in a close parallel relationship.

As shown in FIG. 3, a diode 10 is placed in circuit and supplies a reduced voltage to those components, e.g. light bulbs, which are susceptible to damage or to a shorter life when supplied with higher voltage. When the voltage across the battery is 15 volts, then the voltage across the light bulbs would be reduced to about 14 volts by this diode 10.

As shown in FIG. 4, two or more "reduced voltage supplies" can be provided by a corresponding number of diodes 10 deriving their input from the main voltage supply line of the alternator or battery, each diode 10 providing an output to a "reduced voltage" supply line.

FIG. 5 shows an alternative arrangement in which the, or at least one of the, "reduced voltage" supply line(s) may be obtained by connecting at least one diode 10 in series. This allows the "reduced voltage supply" to be at a still lower voltage.

In the above described embodiments of FIGS. 3 to 5, said at least one diode 10 can provide a voltage drop of about 1 volt largely irrespective of its ambient temperature or the current which it passes.

Figure 6:
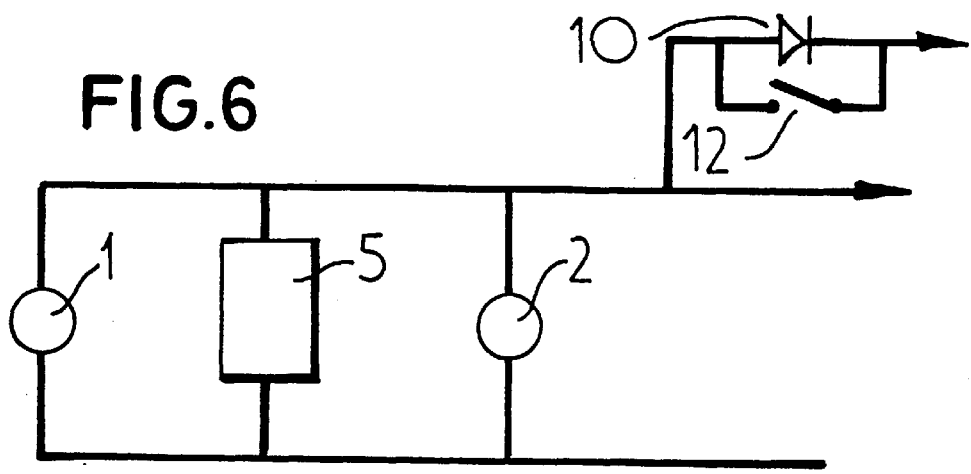
Figure 7:
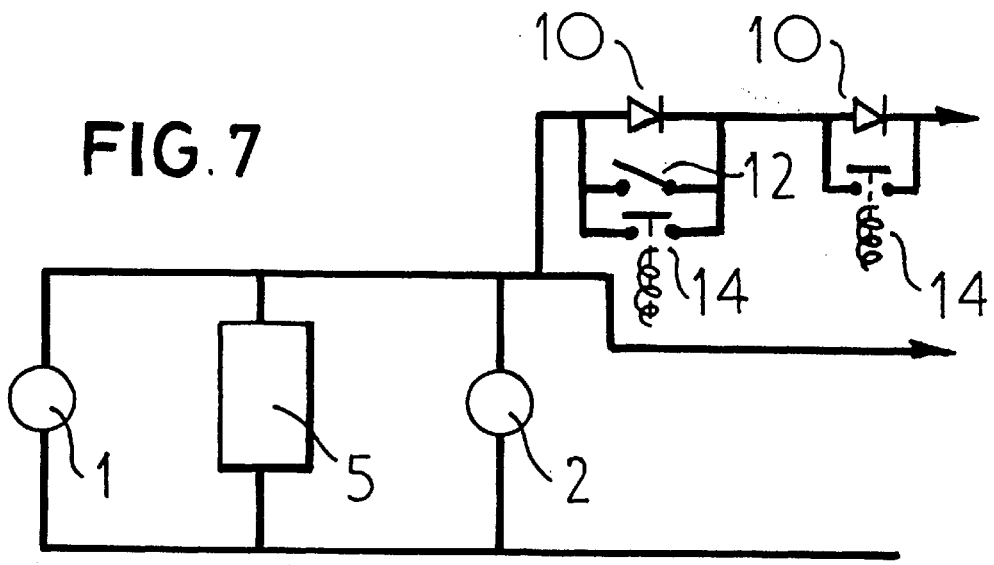

In the embodiments illustrated in FIGS. 6 and 7, a mechanically or electro-mechanically operated switch 12 or 14 is connected across said at least one diode 10. When the engine is not running, the "reduced voltage supply" output from one diode 10 would be approximately 11.6 volts whilst current is passing through it, and closing operation of the switch 12 or 14 to short-circuit the diode would increase this voltage to 12.6 volts. Such a switch 12 or 14 could be arranged so that it is normally closed and operates when the battery temperature falls to a predetermined level, e.g. when the alternator/regulator increases its voltage output to a level which would shorten the life or cause damage to the lights (or other voltage-sensitive components) if the diode 10 in the supply line to them were not present.

Figure 8:
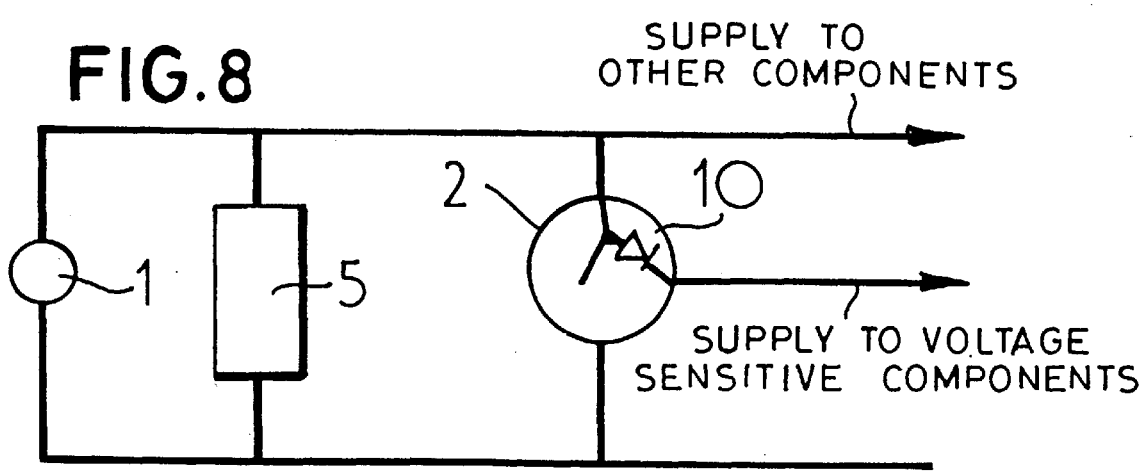
FIG. 8 is a circuit diagram of another embodiment with a schematic illustration of its potential combination with an alternator.
Figure 9:
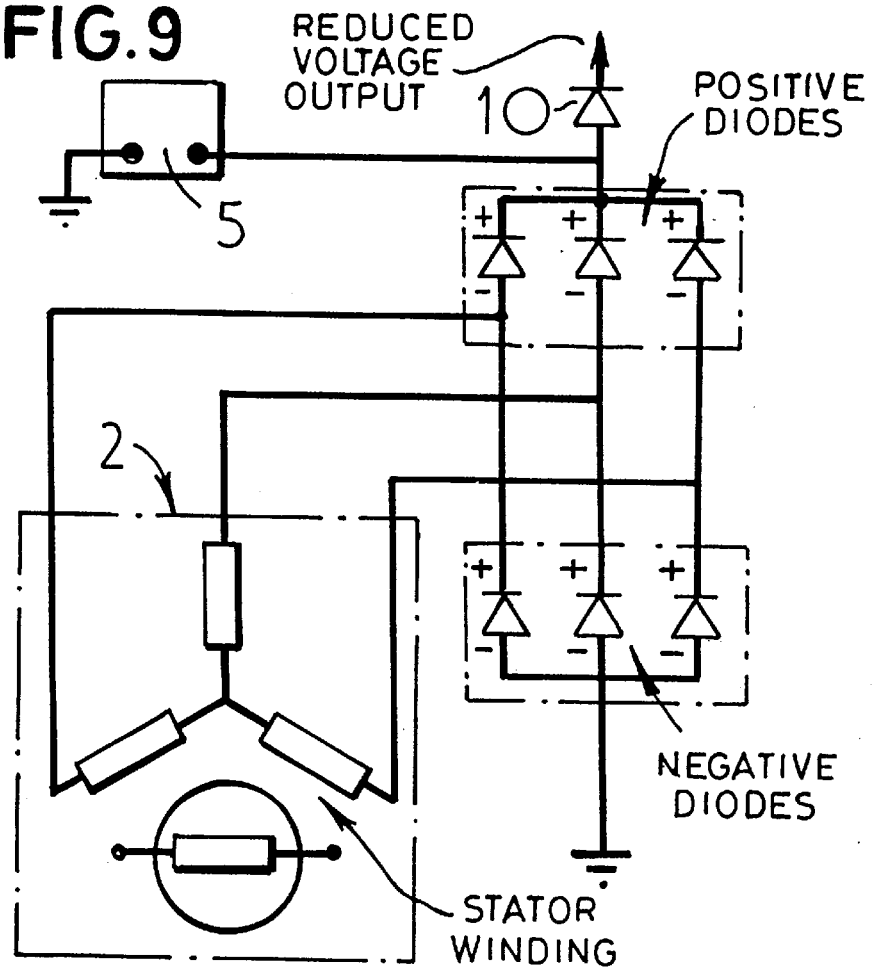
FIG. 9 is a combined schematic and circuit diagram illustrating the alternator-associated embodiment of FIG. 8.
Figure 10:
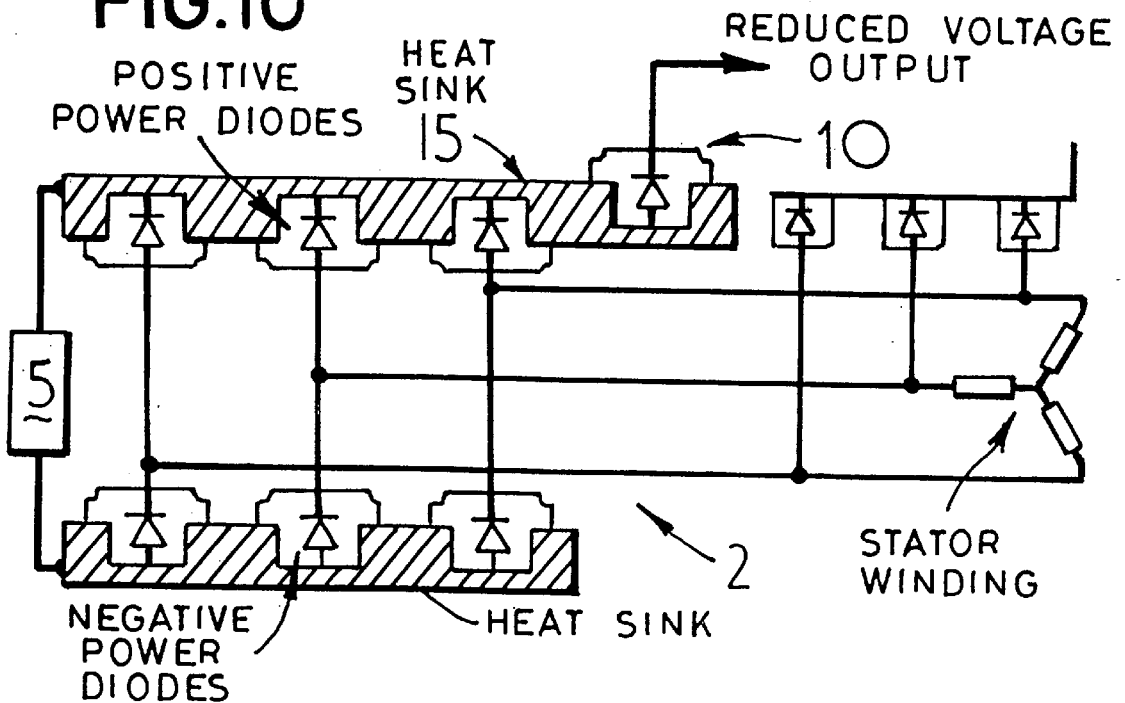
FIG. 10 is another combined schematic and circuit diagram of the embodiment of FIGS. 8 and 9 illustrating incorporation of various components in a heat sink.

The diode 10 may be mounted on a heat-sink 15 which is a metal assembly from which the heat is both radiated and conducted away. This avoids damage to said at least one diode 10 by limiting its temperature rise during use. The diode(s) 10, with or without a heat-sink, can be mounted within the alternator housing (FIGS. 8–10) or in line with a suitable path of cool air. In either such case it would be an advantage to place a switch (not shown) across the diode(s) 10 to avoid heat creation from the diode(s) when the engine is not running, i.e. when neither the alternator nor the engine cooling fan is operating. The switch can be open whilst the engine is running so that the alternator's internal fan cools the diode(s) 10, the latter being housed with the alternator and voltage regulator in the one casing, or being attached to the casing exterior.

Whilst the above-described and illustrated embodiments use at least one diode(s) 10 to provide a forward volt drop from the main alternator/regulator and battery, other, semi-conductor devices may be used instead.

Indeed, many other modifications and embodiments of the invention will be readily apparent to those skilled in this art, all of which are to be deemed within the ambit and scope of the invention, and the invention is not to be deemed limited to the particular embodiment(s) hereinbefore described which may be varied in construction and detail, e.g. interchanging (where appropriate or desired) different features of each, without departing from the scope of the patent monopoly hereby sought.

I claim:

1. In a vehicle having an engine, a transmission to be driven by the engine, an electrical generator to be driven by one of said engine and said transmission, and a battery to supply with said electrical generator electrical power at an output voltage which, under the control of a voltage regulator, varies from a nominal value with variation in ambient temperature, in accord with a substantially linear gradient, an electrical circuit comprising a first sub-circuit and a second sub-circuit, wherein said first sub-circuit includes said battery, said electrical generator and a plurality of first electrical components operably tolerant of supply voltages having an elevated value above said nominal value of the output voltage, said second sub-circuit includes at least one second electrical component that is operably intolerant of prolonged voltage supply at a said elevated value, and wherein said second sub-circuit is connected to the first sub-circuit (a) via a diode to provide a substantially constant voltage drop from the first sub-circuit to the second sub-circuit such as to provide the said at least one second electrical component with a consequential lower voltage that can vary with ambient temperature in accord with a gradient generally parallel to said substantially linear gradient, and (b) via switch means in parallel with the diode to provide, when closed, a direct current path from the first sub-circuit to the second sub-circuit.

2. A circuit as claimed in claim 1, wherein there are provided a plurality of second sub-circuits including a plurality of said second electrical components and connected to the first sub-circuit by a plurality of diodes providing said voltage drop, at least one of said diodes being in parallel with switch means to provide, when closed, a direct current path from the first to the associated second sub-circuit.

3. A circuit as claimed in claim 2 wherein each of said diodes is provided within the casing of said generator.

4. A circuit as claimed in claim 3 wherein said switch means is provided within the casing of said generator.

5. A circuit as claimed in claim 3, wherein said second electrical components include at least one lamp to provide exterior illumination for the vehicle.

6. A circuit as claimed in claim 2, wherein said second electrical components include at least one lamp to provide exterior illumination for the vehicle.

7. A circuit as claimed in claim 2 wherein said switch means is provided within the casing of said generator.

8. A circuit as claimed in claim 1, wherein said diode is provided within the casing of said generator.

9. A circuit as claimed in claim 8 wherein said switch means is provided within the casing of said generator.

10. A circuit as claimed in claim 8, wherein said second electrical components include at least one lamp to provide exterior illumination for the vehicle.

11. A circuit as claimed in claim 1, wherein said switch means is provided within the casing of said generator.

12. A circuit as claimed in claim 11, wherein said second electrical components include at least one lamp to provide exterior illumination for the vehicle.

13. A circuit as claimed in claim 1, wherein said at least one second electrical component includes at least one lamp to provide exterior illumination for the vehicle.

* * * * *